(12) United States Patent
Sako et al.

(10) Patent No.: US 10,607,625 B2
(45) Date of Patent: Mar. 31, 2020

(54) ESTIMATING A VOICE SIGNAL HEARD BY A USER

(71) Applicant: SONY CORPORATION, Tokyo (JP)

(72) Inventors: Yoichiro Sako, Tokyo (JP); Kohei Asada, Kanagawa (JP); Katsuhisa Aratani, Kanagawa (JP); Mitsuru Takehara, Tokyo (JP); Takatoshi Nakamura, Tokyo (JP); Kazunori Hayashi, Tokyo (JP); Takayasu Kon, Tokyo (JP); Yuki Koga, Tokyo (JP); Tomoya Onuma, Shizuoka (JP); Akira Tange, Tokyo (JP); Kazuyuki Sakoda, Chiba (JP); Yasunori Kamada, Kanagawa (JP); Hiroyuki Hanaya, Kanagawa (JP); Kazuhiro Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 172 days.

(21) Appl. No.: 14/759,872

(22) PCT Filed: Nov. 22, 2013

(86) PCT No.: PCT/JP2013/081537
§ 371 (c)(1),
(2) Date: Jul. 8, 2015

(87) PCT Pub. No.: WO2014/112206
PCT Pub. Date: Jul. 24, 2014

(65) Prior Publication Data
US 2015/0356980 A1    Dec. 10, 2015

(30) Foreign Application Priority Data

Jan. 15, 2013  (JP) .................................. 2013-004579

(51) Int. Cl.
*G10L 21/02* (2013.01)
*G10L 21/0208* (2013.01)
(Continued)

(52) U.S. Cl.
CPC ........ *G10L 21/0208* (2013.01); *G10L 21/003* (2013.01); *G10L 17/005* (2013.01);
(Continued)

(58) Field of Classification Search
None
See application file for complete search history.

(56) References Cited

U.S. PATENT DOCUMENTS 6,006,175 A * 12/1999 Holzrichter .......... A61B 5/0507
704/205
7,676,372 B1 * 3/2010 Oba ..................... G09B 21/009
434/169
(Continued)

FOREIGN PATENT DOCUMENTS

JP    2008-099220 A    4/2008
JP    2010-176041 A    8/2010
(Continued)

OTHER PUBLICATIONS

Yanli Zheng et al. "Air-and Bone-Conductive Integrated Microphones for Robust Speech Detection and Enhancement", Automatcif Speech Recognition and Understanding, 2003. ASRU'03.2003 TEEE Workshop, Dec. 3, 2003.*
(Continued)

*Primary Examiner* — Richard Z Zhu
(74) *Attorney, Agent, or Firm* — Chip Law Group

(57) ABSTRACT

There is provided a storage control device including: a filter detecting unit configured to detect a voice signal estimation filter for estimating a first voice signal heard by a specific user himself/herself; an estimation unit configured to esti-
(Continued)

mate the first voice signal heard by the specific user himself/herself, on the basis of a voice signal including a second voice signal of the specific user collected by an air conduction sound collecting unit in accordance with the voice signal estimation filter detected by the filter detecting unit; and a storage control unit configured to cause a storage unit to store the first voice signal estimated by the estimation unit.

14 Claims, 12 Drawing Sheets

(51) Int. Cl.
*G10L 21/003* (2013.01)
*H04R 3/04* (2006.01)
*G10L 21/0364* (2013.01)
*G10L 21/0216* (2013.01)
*H04N 21/432* (2011.01)
*G10L 17/00* (2013.01)

(52) U.S. Cl.
CPC .............. *G10L 21/0364* (2013.01); *G10L 2021/02165* (2013.01); *H04N 21/432* (2013.01); *H04N 21/4325* (2013.01); *H04R 3/04* (2013.01)

(56) References Cited

U.S. PATENT DOCUMENTS

| | | | | |
|---|---|---|---|---|
| 7,765,158 | B2* | 7/2010 | Sugimoto | G11B 19/122 705/51 |
| 7,974,841 | B2* | 7/2011 | Bengtsson | G10L 17/00 381/66 |
| 8,874,448 | B1* | 10/2014 | Kauffmann | G10L 25/78 381/107 |
| 9,443,532 | B2* | 9/2016 | Giesbrecht | G10L 21/0216 |
| 9,685,171 | B1* | 6/2017 | Yang | G10L 21/0208 |
| 2002/0163533 | A1* | 11/2002 | Trovato | G10H 1/368 715/728 |
| 2003/0100345 | A1* | 5/2003 | Gum | G10L 21/00 455/563 |
| 2003/0229496 | A1* | 12/2003 | Yamada | G10L 13/06 704/258 |
| 2004/0267520 | A1* | 12/2004 | Holley, II | G11C 7/16 704/201 |
| 2007/0127787 | A1* | 6/2007 | Castleman | G06K 9/00248 382/118 |
| 2011/0300806 | A1* | 12/2011 | Lindahl | G10L 21/0208 455/63.1 |
| 2013/0246059 | A1* | 9/2013 | Kechichian | G10L 21/0208 704/226 |
| 2014/0153727 | A1* | 6/2014 | Walsh | H04S 7/306 381/58 |
| 2014/0379343 | A1* | 12/2014 | Karimi-Cherkandi | G10L 17/00 704/246 |
| 2015/0269953 | A1* | 9/2015 | Siami | G10L 21/0364 704/201 |

FOREIGN PATENT DOCUMENTS

| | | | |
|---|---|---|---|
| JP | 2010-176042 A | 8/2010 | |
| WO | WO 2012069966 A1 * | 5/2012 | ......... G10L 21/0208 |

OTHER PUBLICATIONS

Takayoshi Nakai, et al., "Hearing paths of one's own speech", The Institute of Electronics, Information and Communication Engineers Technical Report, May 18, 2001, vol. 101, No. 73, pp. 15-22.

* cited by examiner

ESTIMATING A VOICE SIGNAL HEARD BY A USER

TECHNICAL FIELD

The present disclosure relates to a storage control Instruction to draft a KPD/Response—2-month due Aug. 10, 2015—Sony Ref.: SP346594US00; Hazuki Ref.: 5015P-N0132USdevice, a playback control device, and a recording medium.

BACKGROUND ART

Normally, a human's voice sounds different between when directly hearing own voices and when hearing a recording of the own voices, and a feeling of strangeness occurs. This is because voices through bone conduction is heard in addition to voices through air conduction when own voices are heard.

In order to eliminate such feeling of strangeness during playback, for example, Patent Literature 1 discloses a singing voice recording karaoke system that converts raw singing voice recording data on the basis of frequency conversion data of any user when the any user sings a desired song. The frequency conversion data is frequency conversion data for converting voices only through air conduction into combined voices in which voices through bone conduction are added to the voices only through air conduction, the combined voices being acquired on the basis of frequency characteristics of the respective voices input from an air conduction microphone and a bone conduction microphone simultaneously with regard to any user.

CITATION LIST

Patent Literature

Patent Literature 1: JP 2010-176042A

SUMMARY OF INVENTION

Technical Problem

Here, the system described in Patent Literature 1 is specialized in converting and recording voices of a person who sings in Karaoke, and it is assumed that voices collected by a single microphone are from a single person. Accordingly, in the system described in Patent Literature 1, for example, an ID of a user is associated with an ID of a microphone used by the user, and voices input from the microphone are considered as singing voices of the user.

However, the system described in Patent Literature 1 does not refer to converting voices of a specific user when voices of a plurality of speakers are collected by a single microphone such as a case of recording a meeting. In addition, in the system described in Patent Literature 1, voices of a person who sings are converted and recorded at a time of recording. However, Patent Literature 1 does not refer to converting voices that have already been recorded by an air conduction microphone, at a time of playback.

Accordingly, the present disclosure proposes a novel and improved storage control device, playback control device, and recording medium that are capable of estimating a voice signal heard by a specific user himself/herself on the basis of an input voice signal.

Solution to Problem

According to an embodiment of the present disclosure, there is provided a storage control device including: a filter detecting unit configured to detect a voice signal estimation filter for estimating a first voice signal heard by a specific user himself/herself; an estimation unit configured to estimate the first voice signal heard by the specific user himself/herself, on the basis of a voice signal including a second voice signal of the specific user collected by an air conduction sound collecting unit in accordance with the voice signal estimation filter detected by the filter detecting unit; and a storage control unit configured to cause a storage unit to store the first voice signal estimated by the estimation unit.

According to another embodiment of the present disclosure, there is provided a playback control device including: a user specifying unit configured to specify a user; a filter detecting unit configured to detect a voice signal estimation filter corresponding to the user specified by the user specifying unit; an estimation unit configured to estimate a first voice signal heard by the specified user himself/herself, on the basis of a voice signal corresponding to a voice of the specified user among input voice signals in accordance with the voice signal estimation filter detected by the filter detecting unit; and a playback control unit configured to cause a playback unit to play back the first voice signal estimated by the estimation unit.

According to another embodiment of the present disclosure, there is provided a recording medium having a program recorded thereon, the program causing a computer to function as: a filter detecting unit configured to detect a voice signal estimation filter for estimating a first voice signal heard by a specific user himself/herself; an estimation unit configured to estimate the first voice signal heard by the specific user himself/herself, on the basis of a voice signal including a second voice signal of the specific user collected by an air conduction sound collecting unit in accordance with the voice signal estimation filter detected by the filter detecting unit; and a storage control unit configured to cause a storage unit to store the first voice signal estimated by the estimation unit.

According to another embodiment of the present disclosure, there is provided a recording medium having a program recorded thereon, the program causing a computer to function as: a user specifying unit configured to specify a user; a filter detecting unit configured to detect a voice signal estimation filter corresponding to the user specified by the user specifying unit; an estimation unit configured to estimate a first voice signal heard by the specified user himself/herself, on the basis of a voice signal corresponding to a voice of the specified user among input voice signals in accordance with the voice signal estimation filter detected by the filter detecting unit; and a playback control unit configured to cause a playback unit to play back the first voice signal estimated by the estimation unit.

Advantageous Effects of Invention

According to one or more of embodiments of the present disclosure as described above, it is possible to estimate a voice signal heard by a specific user himself/herself on the basis of an input voice signal.

DESCRIPTION OF EMBODIMENTS

Figure 1:
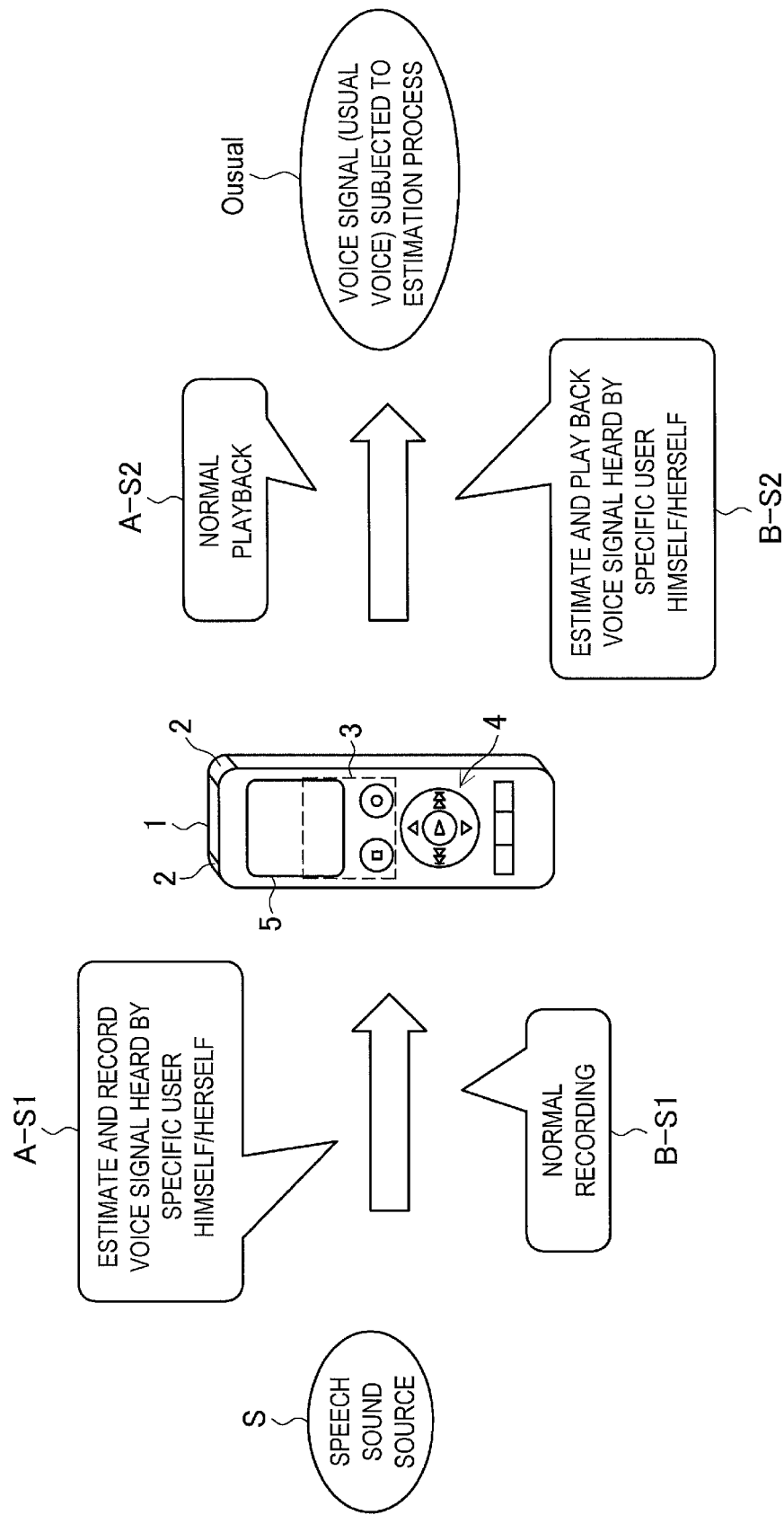
FIG. 1 is a diagram illustrating an overview of a recording and playback control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview of Recording and Playback Control according to Embodiment of Present Disclosure
2. Embodiments
2-1. First Embodiment
2-2. Second Embodiment
2-3. Supplement
3. Conclusion <<1. Overview of Recording and Playback Control System According to Embodiment of Present Disclosure>>

First, with reference to FIG. 1, an overview of a recording and playback control system according to an embodiment of the present disclosure is explained.

FIG. 1 is a diagram illustrating an overview of a recording and playback control system according to an embodiment of the present disclosure. As shown in FIG. 1, the recording and playback control system according to the embodiment is executed by a recording and playback device 1.

As shown in FIG. 1, a display unit 5 and an operation input unit 4 are provided in a front surface of a housing of the recording and playback device 1, microphones 2 are embedded in a top surface of the housing of the recording and playback device 1, and a speaker unit 3 is provided in a rear surface of the housing of the recording and playback device 1. The microphones 2 are provided in both corners of the top surface of the housing as shown in FIG. 1, and can perform stereo sound collection.

The operation input unit 4 includes a power button, a recording/pause button, a stop button, a menu button, a folder button, a playback/OK button, a control button, a volume button, a delete button, and the like. A user can operate each button and gives recording/playback instructions. Note that, each button of the operation input unit 4 is not limited to the front surface of the housing, but may be provided in a side surface.

As explained above, a human's voice sounds different between when directly hearing own voices and when hearing a recording of the own voices, and a feeling of strangeness occurs. In order to eliminate such feeling of strangeness, Patent Literature 1 has been proposed. However, the system described in Patent Literature 1 does not refer to converting voices of a specific user when voices of a plurality of speakers are collected such as a case of recording a meeting. In addition, Patent Literature 1 does not refer to converting voices that have already been recorded by an air conduction microphone, at a time of playback.

Therefore, according to the recording and playback control system of the present disclosure, there is provided the novel and improved recording and playback device 1 that is capable of estimating a voice signal usually heard by a specific user himself/herself on the basis of an input voice signal and that is capable of recording/playing back the estimated voice signal. Note that, in the present specification, the voice signal usually heard by a specific user himself/herself (combined sound of air conduction and bone conduction) is also referred to as a "usual voice", and a voice signal collected by the microphones 2 through air conduction is also referred to as a "recorded voice".

(Case in which Estimation is Performed at a Time of Recording)

In a case in which a usual voice is estimated at a time of recording, the recording and playback device 1 performs a process of Step A-S1 as shown in FIG. 1. That is, the recording and playback device 1 collects a voice signal from a speech sound source S by the microphones 2 through air conduction, estimates a voice signal (usual voice) usually heard by a specific user himself/herself on the basis of the voice signal, and records the estimated voice signal.

The voice signal usually heard by the specific user himself/herself is a voice signal obtained by combining a voice signal through air conduction and a voice signal through bone conduction. Such voice signal (usual voice) usually heard by a specific user himself/herself is estimated by using a voice signal estimation filter corresponding to the specific user stored in advance. In a case in which the microphones 2 collect voice signals of a plurality of speakers, the recording and playback device 1 performs the estimation process on a voice signal spoken by a specific user himself/herself.

Subsequently, at a time of playback, the recording and playback device 1 performs normal playback of the stored voice signal (usual voice; Ousual) subjected to the estimation process, in Step A-S2.

(Case in which Estimation is Performed at a Time of Playback)

On the other hand, in a case in which a usual voice is estimated at a time of playback, the recording and playback device 1 first collects a voice signal from a speech sound source S by the microphones 2 through air conduction and performs normal recording in Step B-S1 as shown in FIG. 1.

Subsequently, at a time of recording, the recording and playback device 1 performs a process of Step A-S2. That is, the recording and playback device 1 estimates a voice signal usually heard by the specific user himself/herself on the basis of the stored voice signal, and plays back the estimated voice signal (usual voice; Ousual). Note that, the recording and playback device 1 may perform the estimation process only on a voice signal spoken by the specific user himself/herself after sound source separation is performed on the stored voice signals, may perform combining again, and may perform playback.

As explained above, a predetermined estimation process is performed on a voice signal of a specific user at a time of recording/playback. Accordingly, it is possible to prevent a feeling of strangeness from occurring in comparison with a his/her own usual voice directly heard by the specific user himself/herself when the specific user playbacks and hears the his/her own recorded voice.

Hereinafter, with reference to a first embodiment, a case in which a predetermined estimation process is performed on a voice signal of a specific user at a time of recording is explained in detail. In addition, with reference to a second embodiment, a case in which a predetermined estimation process is performed on a voice signal of a specific user at a time of playback is explained in detail.

An example shown in FIG. 1 illustrates an integrated circuit (IC) recorder as an example of the recording and playback device 1. However, the recording and playback device 1 according to the present embodiment is not limited to the IC recorder. For example, the recording and playback device 1 according to the present embodiment may be a smartphone, a mobile phone, personal digital assistants (PDA), a personal computer (PC), a tablet terminal, a Blu-ray (registered trademark) disc (BD) recorder, a digital versatile disc (DVD) recorder, a camcorder, a television, a video conference system, or the like.

<<2. Embodiments>>
<2-1. First Embodiment>

First, a case in which a predetermined estimation process is performed on a voice signal of a specific user by using a recording and playback device 1A according to the first embodiment at a time of recording is explained in detail.

[2-1-1. Configuration]

Figure 2:
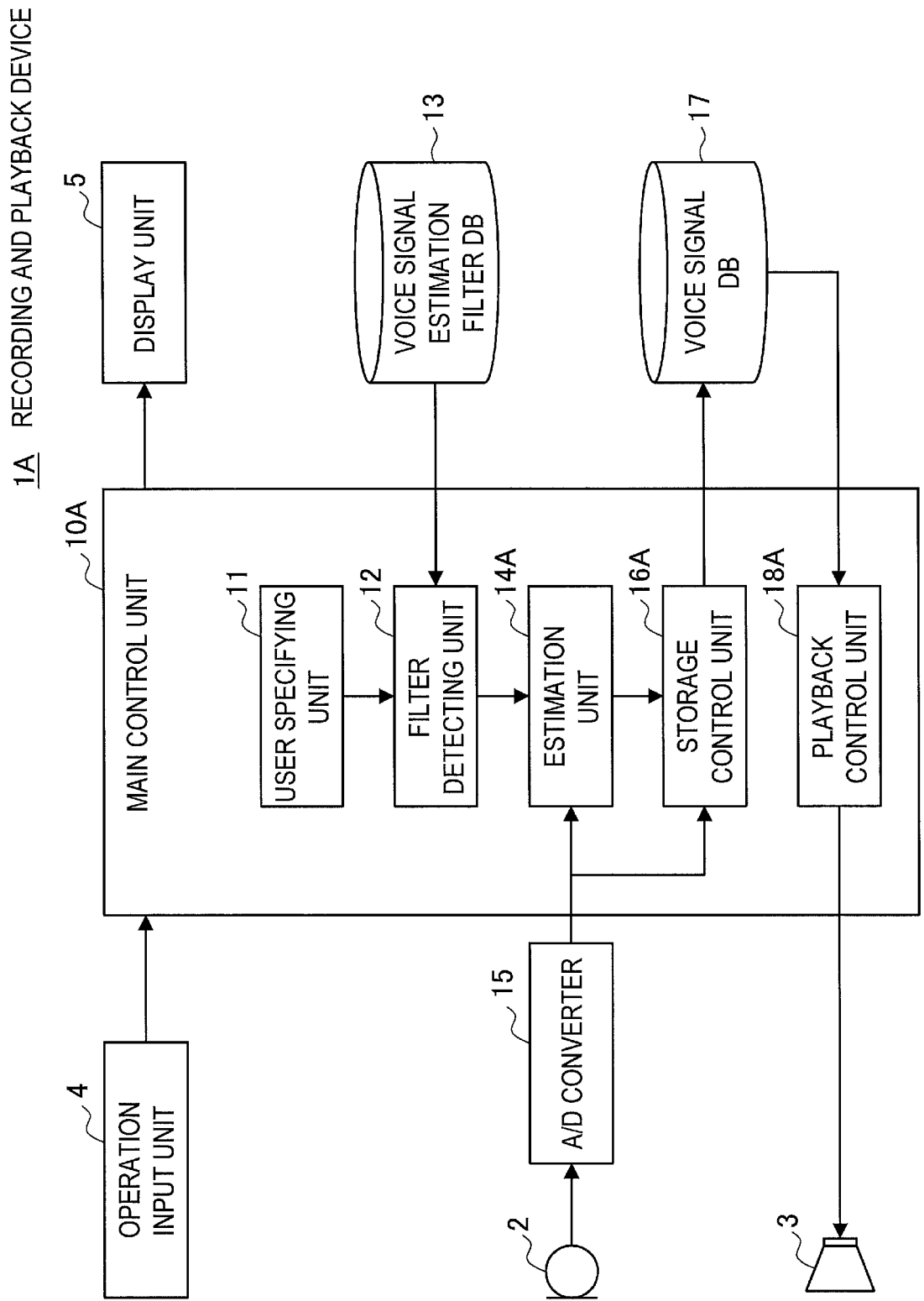
FIG. 2 is a block diagram showing a main configuration of a recording and playback device according to a first embodiment.

FIG. 2 is a block diagram showing a main configuration of the recording and playback device 1A according to the first embodiment. As shown in FIG. 2, the recording and playback device 1A includes a microphone 2, a speaker unit 3, an operation input unit 4, a display unit 5, a main control unit 10A, an analog-digital (A/D) converter 15, a voice signal estimation filter database (DB) 13, and voice signal database (DB) 17.

(Microphone 2)

The microphone 2 is an air conduction sound collecting unit for collecting a sound signal (air conduction sound) through air conduction, and can perform stereo sound collection as described above. The microphone 2 also has a microphone amplifier function of amplifying a voice signal.

(A/D Converter 15)

The A/D converter 15 has a function of converting a voice signal from analog to digital. The A/D converter 15 according to the present embodiment converts an analog voice signal to digital, and outputs the converted voice signal to the main control unit 10A, the analog voice signal having been output from the microphone 2.

(Main Control Unit 10A)

The main control unit 10A is configured by a central processing unit (CPU), read only memory (ROM), and random access memory (RAM), for example. The main control unit 10A controls respective configurations of the recording and playback device 1A.

As shown in FIG. 2, the main control unit 10A according to the present embodiment functions as a user specifying unit 11, a filter detecting unit 12, an estimation unit 14A, a storage control unit 16A, and a playback control unit 18A.

The user specifying unit 11 specifies a user to be subjected to an estimation process automatically or in response to a user operation. According to an automatic estimation method, for example, the user specifying unit 11 may perform speaker recognition on a collected voice signal and specify a user. On the other hand, in a case in which there is a plurality of speakers, a speaker of a nearest sound source may be specified as the user. Alternatively, in a case in which the recording and playback device 1A includes a plurality of microphones 2, the user specifying unit 11 may specify a speaker of a sound source nearest to a predetermined microphone 2 as the user. A correspondence between the microphone 2 and a specific user is described later with reference to FIG. 5.

On the other hand, in a case in which a user is specified in response to a user operation, for example, the user specifying unit 11 may specify the user on the basis of a user name, an ID number, or the like that have been input by the user through operation input/voice input.

In addition, the user specifying unit 11 outputs information (specification result) indicating the specified user to the filter detecting unit 12.

The filter detecting unit 12 detects a voice signal estimation filter corresponding to the user specified by the user specifying unit 11 from a voice signal estimation filter DB 13. The filter detecting unit 12 is not limited to perform estimation from the voice signal estimation filter DB 13 included in the recording and playback device 1A. The filter detecting unit 12 may detect a voice signal estimation filter from a predetermined server in a network. Note that, details of the voice signal estimation filter are explained in "2-1-2. Voice Signal Estimation Filter" as follows.

Subsequently, the filter detecting unit 12 outputs the detected estimation filter to the estimation unit 14A.

On the basis of the voice signal collected by the microphone 2, the estimation unit 14A performs a process to estimate a voice signal (usual voice) that is directly heard by the user usually, by using the estimation filter detected by the filter detecting unit 12. More specifically, the estimation unit 14A separates voice signals (voice signals through air conduction; recorded voice) of a specific user from among voice signals collected by the microphone 2 into a sound source, and performs an estimation process using the estimation filter. Alternatively, in a case in which the plurality of microphones 2 are provided in the recording and playback device 1A, the estimation process using the estimation filter may be performed on voice signals collected by a predetermined microphone 2.

Subsequently, the estimation unit 14A outputs the estimated voice signals to the storage control unit 16A.

The storage control unit 16A causes a voice signal DB 17 to store the voice signals (usual voices) estimated by the estimation unit 14A. Alternatively, in response to a user operation, the storage control unit 16A may cause a voice signal DB 17 to directly store the voice signals (recorded voices) collected by the microphone 2.

The playback control unit 18A reads out the voice signals stored in the voice signal DB 17, and controls the speaker unit 3 to play back the voice signals.

(Voice Signal Estimation Filter DB 13)

The voice signal estimation filter DB 13 is a storage unit (storage medium) configured to store a voice signal estimation filter corresponding to each user. For example, the voice signal estimation filter DB 13 is implemented as a hard disc drive (HDD). As the recording medium, various kinds of media may be used, including solid-state memory such as flash memory, memory cards incorporating solid-state memory, optical discs, magneto-optical discs, and hologram memory. The voice signal estimation filter DB 13 may have a configuration which can execute storage and playback in accordance with the storage medium to be adopted.

(Voice Signal DB 17)

The voice signal DB 17 is a storage unit (storage medium) configured to store the voice signals of the specific user estimated by the estimation unit 14A in accordance with the control performed by the storage control unit 16A. The voice signal DB 17 may store voice signals collected by the microphone 2. For example, the voice signal DB 17 is implemented as a hard disc drive (HDD).

(Speaker Unit 3)

The speaker unit 3 is an output unit (playback unit) configured to output (play back) a voice signal, and can include an amplifier circuit. The speaker unit 3 according to the present embodiment plays back the voice signals stored in the voice signal DB 17 in accordance with the control performed by the playback control unit 18A.

(Operation Input Unit 4)

The operation input unit 4 has a function of detecting a user operation and outputting the user operation to the main control unit 10A. As explained above, the operation input unit 4 is implemented as various kinds of physical buttons provided on the front surface or the side surface of the housing of the recording and playback device 1. The operation input unit 4 may perform voice recognition on voices collected by the microphone 2, and detect voice input by a user.

(Display Unit 5)

The display unit 5 displays various kinds of screens such as a menu screen, a folder screen, a playback screen, and a recording screen, in accordance with control performed by the main control unit 10A. The display unit 5 is implemented as a liquid crystal panel, an organic EL panel, an LED display panel, or the like.

The main configuration of the recording and playback device 1A according to the present embodiment has been explained. Next, with reference to FIGS. 3 to 4, the voice signal estimation filter is explained in detail.

[2-1-2. Voice Signal Estimation Filter]

Figure 3:
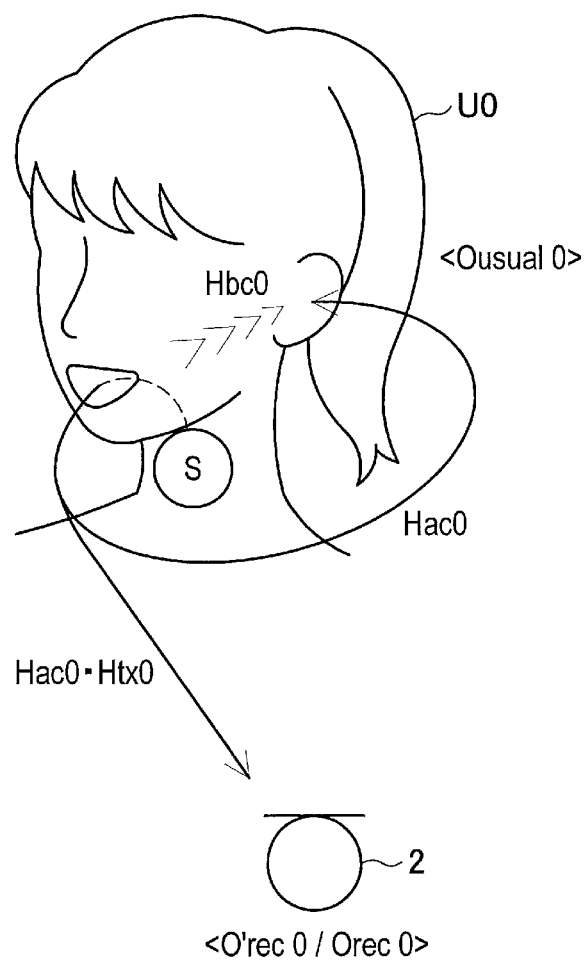
FIG. 3 is a diagram illustrating difference between an own voice and a recorded voice.

FIG. 3 is a diagram illustrating difference between an own voice and a recorded voice. In the present specification, a his/her own voice signal (usual voice) that is directly heard by a user U0 himself/herself usually is referred to as "Ousual0", and a voice signal (recorded voice) of the user U0 collected (recorded) by the microphone 2 is referred to as "O'rec0/Orec0".

In addition, as shown in FIG. 3, a speech sound source when the user U0 speaks is represented by "S". A transfer function until a voice signal from the speech sound source S reaches an ear (auditory organ) of the user U0 himself/herself is obtained by combining two paths including Hac0 of an air conduction system and Hbc0 of a bone conduction system, as shown in Expression 1 as follows. Note that, in Expression 1, ac represents air conduction, and be represents bone conduction.

[Math 1]

$$Ousual0 = (Hac0 + Hbc0) \times S \quad \text{Expression 1}$$

Next, a transfer function until a voice signal from the speech sound source S reaches a microphone 2 is Expression 2 as follows, where Htx0 in FIG. 3 represents an interpolation component in the spatial transfer function.

[Math 2]

$$O'rec0 = Htx0 \times Hac0 \times S \quad \text{Expression 2}$$

Here, in the example shown in FIG. 3, it is assumed that the microphone 2 is positioned farther than the ear of the user U0. Although Htx0 is shown in addition to Hac0 so as to simplify the explanation, Htx0 is the interpolation component with regard to Hac0, and Htx0 does not necessarily match the transfer function representing a space. For example, in a case in which the microphone 2 is positioned nearer than the ear, an inverse component in the spatial transfer function is also considered. In any case, the spatial transfer function can be represented by using Htx0 and Hac0 as shown in Expression 2.

However, the present embodiment focuses on tone (or characteristics, frequencies) of voices that varies by the individual, and does not refer to temporal or topological components. Accordingly, when a minimum phase system is considered, Htx0 is not necessarily considered except a special space such as a case of including much echo. Thus, in the case where Htx0 is left out of consideration, the transfer function until a voice signal from the speech sound source S reaches a microphone 2 is represented by Expression 3 as Orec0 as follows.

[Math 3]

$$Orec0 = Hac0 \times S \quad \text{Expression 3}$$

As described above, the voice signal estimation filter used by the estimation unit 14A according to the first embodiment estimates a voice signal equivalent of a voice signal (usual voice) that is directly heard by a specific user usually, or a voice signal approaching the voice signal (usual voice) that is directly heard by the specific user usually, on the basis of a voice signal (recorded voice) collected by the microphone 2. Accordingly, on the basis of Expression 1 and Expression 3, the estimation process performed by the estimation unit 14A using the voice signal estimation filter is represented by Expression 4 as follows.

[Math 4]

$$Ousual0 = \{(Hac0 + Hbc0)/Hac0\} \times Orec0 \quad \text{Expression 4}$$

It may be possible to find values of Hac0 and Hbc0 described above on the basis of a vocal fold model selected by the user U0 or a measured data of the user U0. On the other hand, if Hac0 and Hbc0 are unknown, the estimation unit 14A can estimate the usual voice (Ousual0) from the recorded voice (Orec0) by using ratio (difference) between Hac0 and Hbc0 as shown in Expression 4 when the ration is known.

The case of the specific user U0 has been explained above. The estimation unit 14A also can estimate other users U1, U2, . . . by using a predetermined voice signal filter. Normally, a shape and bone density of a skull, a structure of a face, and a radiation characteristic of a mouth varies by the individual. Accordingly, it is obvious that characteristics of Hac and Hbc according to the present embodiment vary by the individual.

Accordingly, it is assumed that a plurality of transfer functions such as "Hac0 and Hbc0", "Hac1 and Hbc1" and "Hac2 and Hbc2" are preset in the voice signal estimation filter DB 13. The filter detecting unit 12 detects a transfer function corresponding to the user specified by the user specifying unit 11 as a voice signal estimation filter from the voice signal estimation filter DB 13. Specifically, the filter detecting unit 12 may detect the transfer function on the basis of the facial shape of the specified user, or may detect a transfer function previously associated with the user (transfer function calculated after actual measurement for each user).

Subsequently, the estimation unit 14A can estimate a usual voice corresponding to each user as shown in Expression 5 as follows on the basis of the voice signals collected by the microphone 2.

[Math 5]

$$Ousual\_n = \{(Hac\_n + Hbc\_n)/Hac\_n\} \times Orec\_n \qquad \text{Expression 5}$$

In addition, in a case in which the voice signals collected by the microphone 2 through air conduction are voice signals of the plurality of speakers, the estimation unit 14A according to the present embodiment separates voice signals (recorded voices) of a specific user from the voice signals collected by the microphone 2, and estimates voice signals (usual voices) that is directly heard by the specific user usually on the basis of the separated voice signals. Subsequently, the estimated voice signals are combined again with other voice signals, and are stored in the voice signal DB 17. Next, with reference to FIG. 4, an estimation process based on voice signals of a plurality of speakers is explained in detail.

Figure 4:
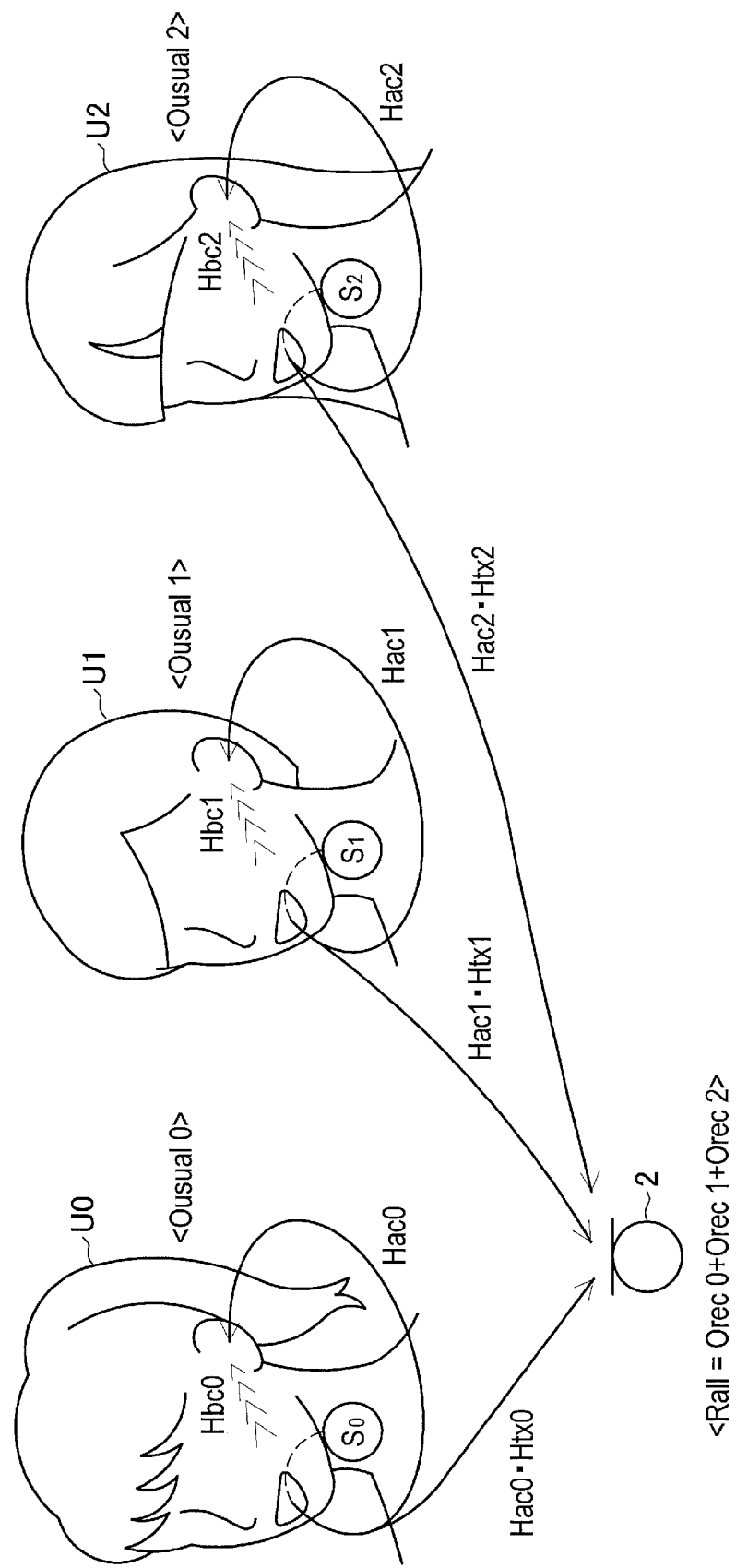
FIG. 4 is a diagram illustrating a case in which a single microphone collects voice signals of a plurality of speakers.

FIG. 4 is a diagram illustrating a case in which a single microphone 2 collects voice signals of a plurality of speakers. As shown in FIG. 4, in a case in which users U0, U1, and U2 speak in a meeting or the like, the microphone 2 of the recording and playback device 1A collects sound in which voice signals of respective speech sound sources S0, S1, and S2 through air conduction are combined. Here, voice signals collected by the microphone 2 are represented by Expression 6 as follows. In Expression 6, Orec0 represents recorded voices of the user U0, Orec1 represents recorded voices of the user U1, and Orec2 represents recorded voices of the user U2.

[Math 6]

$$Rall = Orec0 + Orec1 + Orec2 \qquad \text{Expression 6}$$

In this case, for example, when the user specifying unit 11 specifies the user U0, the filter detecting unit 12 detects a voice signal estimation filter (for example, Hac0 and Hbc0) corresponding to the user U0 from the voice signal estimation filter DB 13, and outputs the detected voice signal estimation filter to the estimation unit 14A. Subsequently, on the basis of the voice signal (recorded voice; Orec0) of the user U0, the estimation unit 14A estimates voice signals (usual voice; Ousual0) that is directly heard by the user U0 himself/herself usually from the voice signals collected by the microphone 2, and combines the usual voice with other voice signals. Accordingly, it is possible to generate a voice signal ideal for the user U0 without a feeling of strangeness. Such voice signal ideal for the user U0 without a feeling of strangeness is represented by Expression 7 as follows. In Expression 7, a voice signal ideal for the user U0 is generated as an example. In a similar way, the estimation unit 14A can generate a voice signal ideal for the user U1 or the user U2. Specifically, on the basis of the collected voice signals (recorded voice; Orec1) of the user U1, the estimation unit 14A can estimate voice signals (usual voice; Ousual1) that is directly heard by the user U1 himself/herself usually, combine the usual voice with other voice signals, and generate voice signals ideal for the user U1. Alternatively, on the basis of the collected voice signal (recorded voice; Orec2) of the user U2, the estimation unit 14A can estimate voice signals (usual voice; Ousual2) that is directly heard by the user U2 himself/herself usually, combine the usual voice with other voice signals, and generate voice signals ideal for the user U2.

[Math. 7]

$$\begin{aligned}Rideal &= Ousual0 + Orec1 + Orec2 \\ &= \{(Hac0 + Hbc0)/Hac0\} \times \\ & \quad Orec0 + Orec1 + Orec2\end{aligned} \qquad \text{Expression 7}$$

There has been explained the process for estimating a voice signal ideal for any specific user without a feeling of strangeness in the case in which the single microphone 2 collects voice signals of the plurality of speakers. Note that, in the above example, the estimation unit 14A has to separate the voice signals collected by the microphone 2 (for example, omnidirectional microphone) into sound sources, and has to identify a voice signal of a specific user. On the other hand, in a case in which the recording and playback device 1A includes a plurality of microphones 2 (for example, directional microphones), the estimation unit 14A can identify a voice signal collected by a predetermined microphone 2 as a voice signal of a specific user. Next, detailed explanation is provided with reference to FIG. 5.

(Association between Microphone and Specific User)

Figure 5:
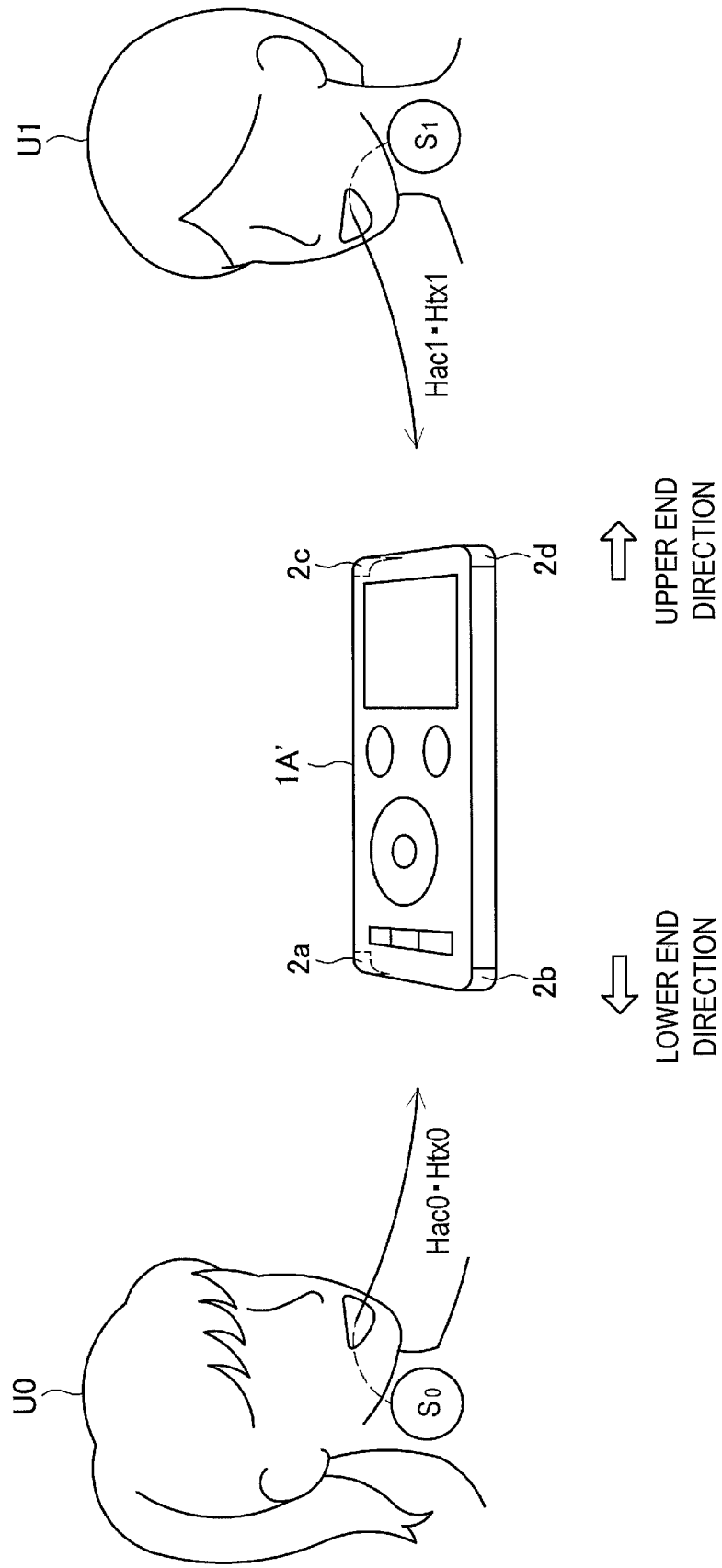
FIG. 5 is a diagram illustrating specifying a user in a case in which a plurality of directional microphones are included in a recording and playback device according to a modification of the first embodiment.

FIG. 5 is a diagram illustrating specifying a user in a case in which a plurality of directional microphones 2a to 2d are included in a recording and playback device 1A' according to a modification of the first embodiment. As shown in FIG. 5, in a case in which the directional microphones 2a to 2d are embedded in four corners of a housing of the recording and playback device 1A' for example, the user specifying unit 11 recognizes sound signals collected by the microphones 2a and 2b provided at a lower end side of the recording and playback device 1A' as voice signals of a specific user, for example.

Thus, in a case in which the user U0 records a conversation with the user U1, it is assumed that the recording and playback device 1A' is positioned in a manner that an upper end of the recording and playback device 1A' faces the user U1 side, and a lower end of the recording and playback device 1A' faces the user U0 side as shown in FIG. 5. In addition, after the voice signals of the user U0 are collected and recorded via the microphones 2a and 2b provided at the lower end side of the recording and playback device 1A', it is assumed that the user U0 plays back and listens recorded content. In this case, it is desirable that the voice signals of the user U0 are subjected to the estimation process and recorded in the recording and playback device 1A'. Accordingly, the user specifying unit 11 of the recording and playback device 1A' recognizes, as voice signals of a specific user, voice signals collected by the microphones 2a and 2b provided toward a direction in which the user whose voices is likely to be recorded, played back, and heard is positioned.

In this case, the user specifying unit 11 performs speaker recognition on the basis of the voice signals collected by the microphones 2a and 2b and specifies the user U0, and the filter detecting unit 12 detects the voice signal estimation filter corresponding to the specified user U0 from the voice signal estimation filter DB 13.

The voice signal estimation filter according to the present embodiment has been explained in detail. Note that, the above-described estimation process using the transfer function is an example of estimation processes in the present disclosure, and not limited thereof.

[2-1-3. Operation Process]

Figure 6:
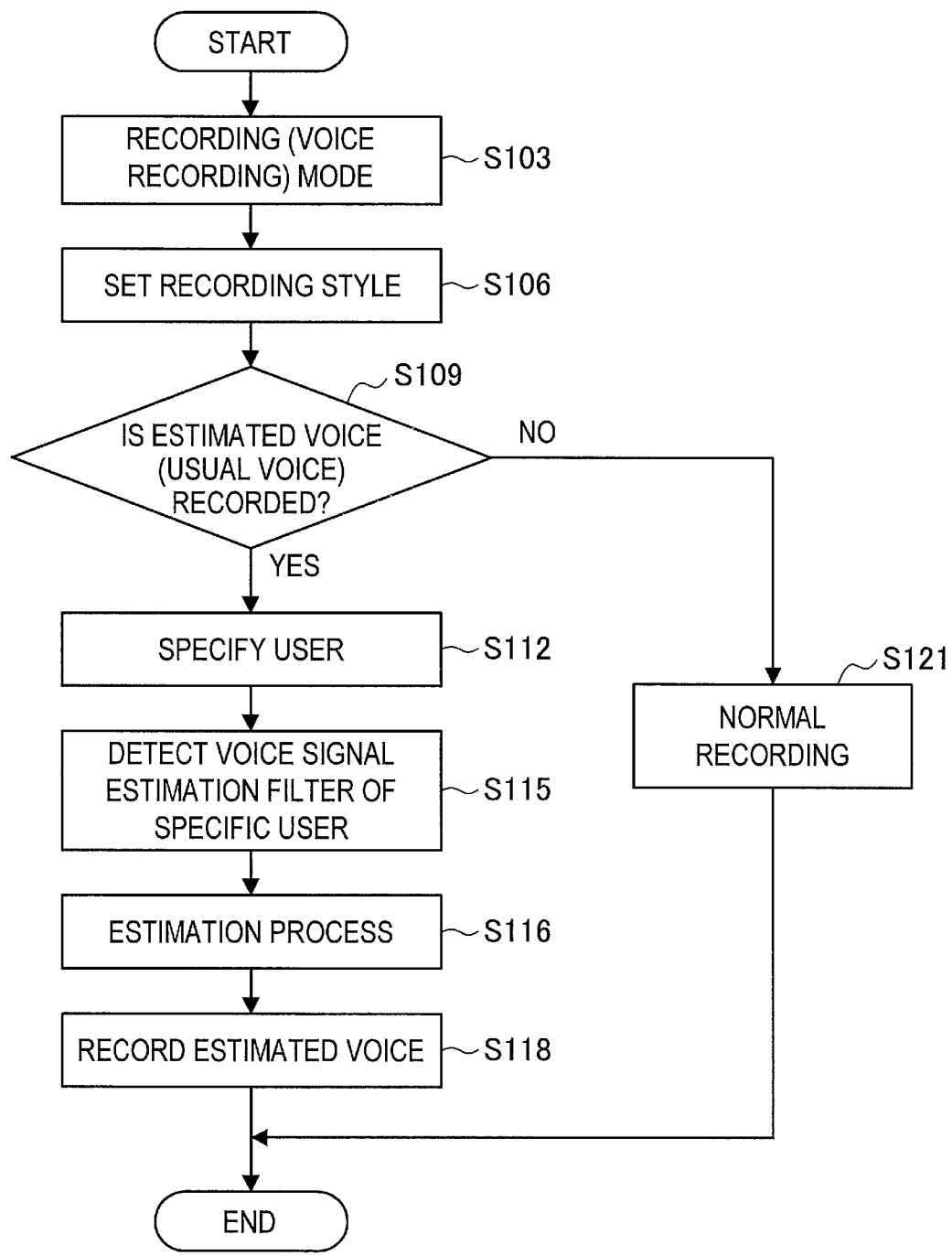
FIG. 6 is a flowchart showing a recording control process according to the first embodiment.

Next, with reference to FIG. 6, an operation process in the recording and playback device 1A according to the first embodiment is explained.

FIG. 6 is a flowchart showing a recording control process according to the first embodiment. As shown in FIG. 6, first, in Step S103, the recording and playback device 1A is set to a recording (voice signal storing) mode in response to a user operation.

Next, in Step S106, a recording style is set in response to a user operation. The recording style includes normal recording and recording of a voice signal (usual voice) subjected to the estimation process according to the present embodiment.

Subsequently, in a case in which the recoding of the voice signal subjected to the estimation process is set (YES in Step S109), the user specifying unit 11 of the recording and playback device 1A specifies a user to be estimated in Step S112.

Next, in Step S115, the filter detecting unit 12 detects a voice signal estimation filter corresponding to the specific user from the voice signal estimation filter DB 13.

Subsequently, in Step S116, the estimation unit 14A performs an estimation process on voice signals of the specific user by using the detected voice signal estimation filter. Specifically, on the basis of the voice signals (recorded voices) of the specific user collected by the microphone 2 through air conduction, the estimation unit 14A estimates voice signals (usual voices) that is directly heard by the specific user usually through air conduction and bone conduction.

Subsequently, in Step S118, the storage control unit 16A causes the voice signal DB 17 to store the voice signals estimated by the estimation unit 14A.

On the other hand, in a case in which the normal recording is set (NO in Step S109), the storage control unit 16A of the recording and playback device 1A causes the voice signal DB 17 to directly store the normal recording, in other words, the voice signals collected by the microphone 2 through air conduction, in Step S121.

The configuration and the operation process of the recording and playback device 1A according to the first embodiment have been explained in detail. According to the present embodiment, the recording and playback device 1A can perform a predetermined estimation process on a voice signal of a specific user, and can record the estimated voice signal.

Note that, the operation process in the recording and playback device 1A according to the present embodiment is not limited to the example shown in FIG. 6. For example, the recording and playback device 1A may repeatedly perform S112 to S118 shown in FIG. 6, and may perform the estimation process in accordance with voice signal estimation filters corresponding to specific users detected sequentially in response to switching of a specific user.

<2-2. Second Embodiment>

Next, a second embodiment is explained. In the second embodiment, a case in which a predetermined estimation process is performed by using a recording and playback device 1B on a voice signal of a specific user at a time of playback is explained in detail.

[2-2-1. Configuration]

Figure 7:
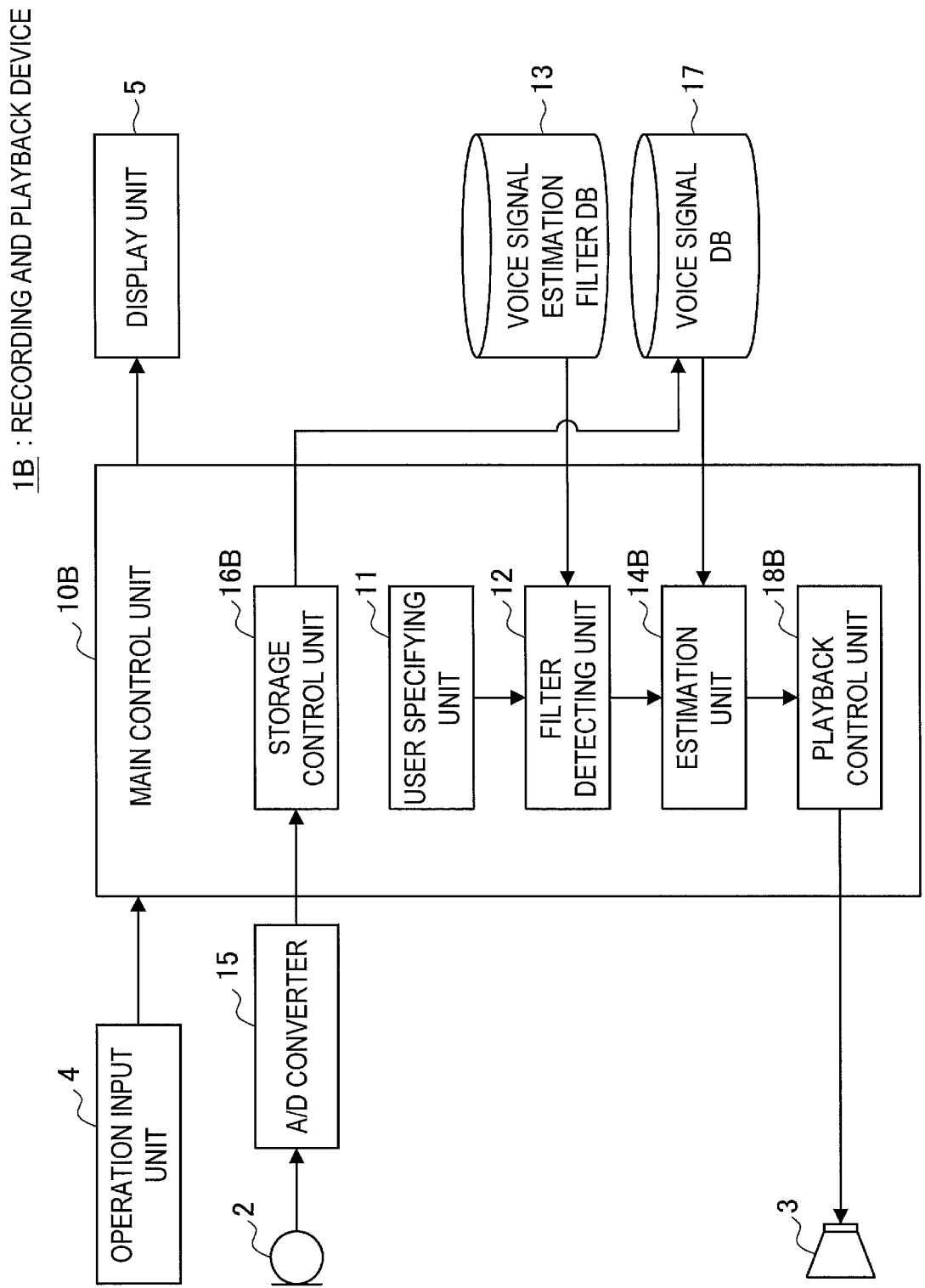
FIG. 7 is a block diagram showing a main configuration of a recording and playback device according to a second embodiment.

FIG. 7 is a block diagram showing a main configuration of the recording and playback device 1B according to the second embodiment. As shown in FIG. 7, the recording and playback device 1B includes a microphone 2, a speaker unit 3, an operation input unit 4, a display unit 5, a main control unit 10B, an A/D converter 15, a voice signal estimation filter DB 13, and a voice signal DB 17.

Respective functions of the microphone 2, the speaker unit 3, the operation input unit 4, the display unit 5, the A/D converter 15, the voice signal estimation filter DB 13, and the voice signal DB 17 are similar to the same blocks included in the recording and playback device 1A according to the first embodiment explained with reference to FIG. 2. Accordingly, repeated explanation is omitted. As described later, the voice signal DB 17 stores voice signals collected by the microphone 2 through air conduction.

The main control unit 10B is configured by a CPU, ROM, and RAM, for example. The main control unit 10B controls respective configurations of the recording and playback device 1B. As shown in FIG. 7, the main control unit 10B according to the present embodiment functions as a user specifying unit 11, a filter detecting unit 12, an estimation unit 14B, a storage control device 16B, and a playback control device 18B.

(Storage Control Unit 16B)

The storage control unit 16B according to the present embodiment causes the voice signal DB 17 to directly store voice signals collected by the microphone 2 through air conduction.

(User Specifying Unit 11)

The user specifying unit 11 specifies a user to be subjected to an estimation process automatically or in response to a user operation, in a way similar to the same block included in the main control unit 10A in the recording and playback device 1A according to the first embodiment explained with reference to FIG. 2.

(Filter Detecting Unit 12)

The filter detecting unit 12 detects a voice signal estimation filter corresponding to the user specified by the user specifying unit 11 from the voice signal estimation filter DB 13, in a way similar to the same block included in the main control unit 10A in the recording and playback device 1A according to the first embodiment explained with reference to FIG. 2.

(Estimation Unit 14B)

On the basis of the voice signal (input voice signal) read out from the voice signal DB 17, the estimation unit 14B performs a process to estimate a voice signal (usual voice) that is directly heard by the user usually, by using the estimation filter detected by the filter detecting unit 12. Expression 1 to Expression 7 described above can also be applied to the estimation process performed by the estimation unit 14B since the estimation process is a process to estimate the voice signal (usual voice) that is directly heard by the user usually by using the voice signal estimation filter on the basis of voice signal (recorded voice) through air conduction.

Alternatively, the estimation unit 14B can separate voice signals (voice signal through air conduction; recorded voice) of a specific user from voice signals of other users, noise, and environmental sound among input voice signals into a sound source, and can perform an estimation process using an estimation filter. Next, with reference to FIG. 8, the estimation unit 14B according to the present embodiment is explained in detail.

Figure 8:
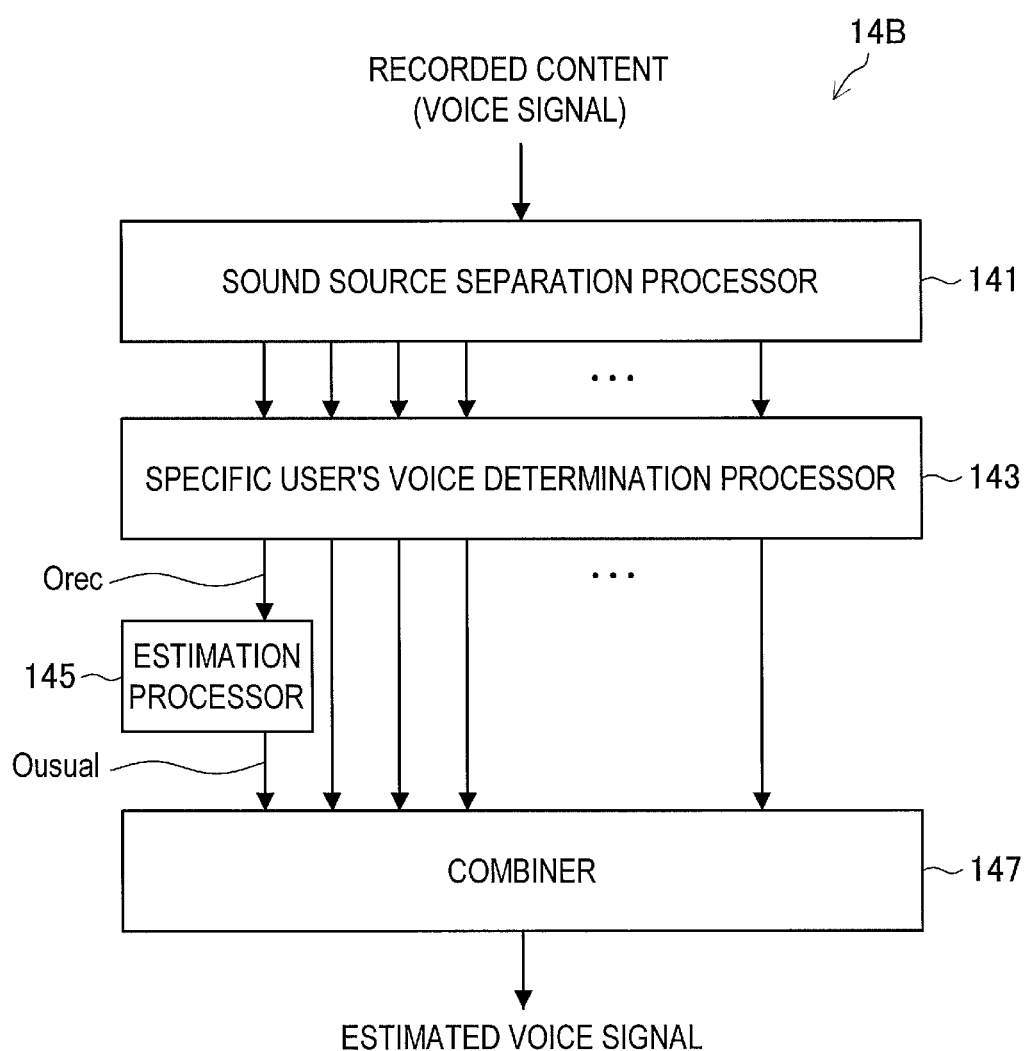
FIG. 8 is a block diagram showing a functional configuration of an estimation unit according to the second embodiment.

FIG. 8 is a block diagram showing a functional configuration of the estimation unit 14B according to the second embodiment. As shown in FIG. 8, the estimation unit 14B functions as a sound source separation processor 141, a specific user's voice determination (recognition) processor 143, an estimation processor 145, and a combiner 147.

The sound source separation processor 141 performs a sound source separation process on the recorded content, in other words, voice signals read out from the voice signal DB 17. The sound source separation processor 141 may performs a sound source separation process using at least one of independent component analysis (ICA), principal component analysis (PCA), and singular value decomposition (SVD), for example.

The specific user's voice determination processor 143 determines (identifies or recognizes) voice signals of the user specified by the user specifying unit 11 from the respective voice signals separated into sound sources by the sound source separation processor 141. For example, the voice determination processor 143 may perform speaker recognition on respective voice signals, and may determine voice signals of the specific user. Alternatively, the voice determination processor 143 may play back respective voice signals after effector adjustment, and may allow a user to select voice signals of the specific user.

The estimation processor 145 performs a process to estimate a voice signal (Ousual in FIG. 8) that is directly heard by the specific user himself/herself usually, on the basis of voice signals (Orec in FIG. 8) determined to be the voice signals of the specific user. Specifically, the process is performed by using the voice signal estimation filter corresponding to the specific user detected by the filter detecting unit 12 as explained above.

The combiner 147 performs a process to combine the voice signals of the specific user subjected to the estimation process by the estimation processor 145, with other voice signals separated into a sound source. Subsequently, the combined voice signals are outputted to the playback control unit 18B as voice signals subjected to the estimation process.

(Playback Control Unit 18B)

The playback control unit 18A performs control in a manner that the speaker unit 3 plays back the voice signals subjected to the estimation process by the estimation unit 14B.

The voice signal estimation filter according to the present embodiment has been explained in detail. Next, with reference to FIG. 9, an operation process in the recording and playback device 1B according to the present embodiment is explained.

[2-2-2. Operation Process]

Figure 9:
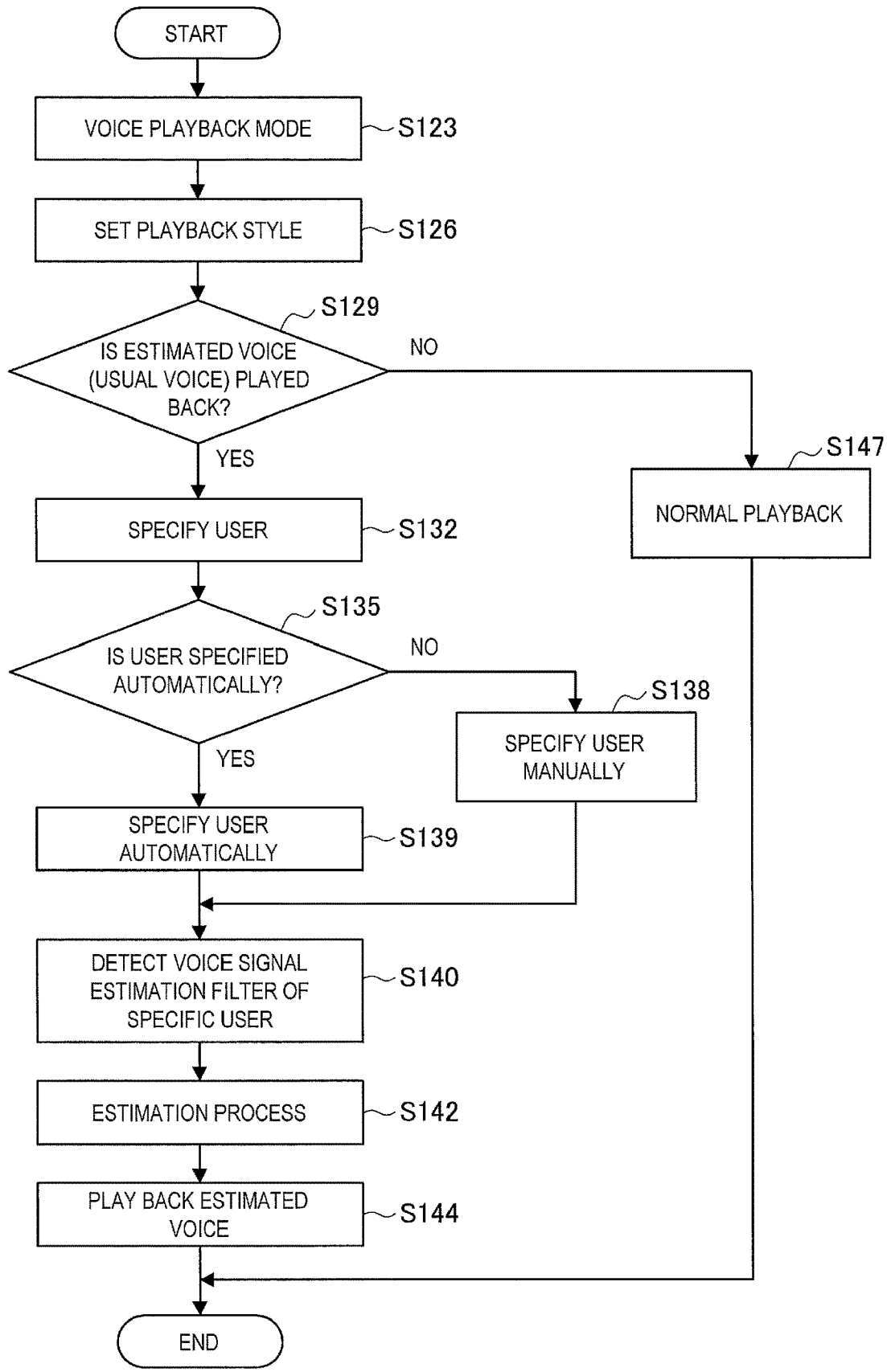
FIG. 9 is a flowchart showing a recording control process according to the second embodiment.

FIG. 9 is a flowchart showing a recording control process according to the second embodiment. As shown in FIG. 9, first, in Step S123, the recording and playback device 1B is set to a voice playback (voice signal output) mode in response to a user operation.

Next, in Step S126, a playback style is set in response to a user operation. The playback style includes normal playback and playback of a voice signal (usual voice) subjected to the estimation process according to the present embodiment.

Subsequently, in a case in which setting the playback of the voice signal subjected to the estimation process is set (YES in Step S129), the user specifying unit 11 of the recording and playback device 1B specifies a user to be estimated in Step S132.

In a case in which a user is specified manually (NO in Step S135), the user specifying unit 11 specifies the user in response to a user operation input through the operation input unit 4 in Step S138. Specifically, for example, the user specifying unit 11 may specify the user on the basis of a user name and ID number that have been input.

On the other hand, in a case in which a user is specified automatically (YES in Step S135), for example, the user specifying unit 11 may specify a user registered in advance, or the user specifying unit 11 may analyze the voice signals and specify a speaker of voice signals closest to a speech sound source in Step S139.

Next, in Step S140, the filter detecting unit 12 detects a voice signal estimation filter corresponding to the specific user specified by the user specifying unit 11 from the voice signal estimation filter DB 13.

Subsequently, in Step S142, the estimation unit 14B performs an estimation process on voice signals of the specific user by using the detected voice signal estimation filter. Specifically, on the basis of the specific user's voice signals (recorded voices) through air conduction that are read out from the voice signal DB 17, the estimation unit 14B estimates voice signals (usual voices) that is directly heard by the specific user usually, in other words, voice signals through air conduction and bone conduction.

Subsequently, in Step S144, the playback control device 18B causes the speaker unit 3 to play back the voice signals estimated by the estimation unit 14B.

On the other hand, in a case in which the normal playback is set (NO in Step S129), the playback control unit 16B of the recording and playback device 1B causes the speaker unit 3 to perform the normal playback, in other words, to directly play back the voice signals through air conduction that are read out from the voice signal DB 17, in Step S147.

The configuration and the operation process of the recording and playback device 1B according to the second embodiment have been explained in detail. According to the present embodiment, the recording and playback device 1B can perform a predetermined estimation process on a voice signal of a specific user, and can play back an estimated voice signal.

Note that, the operation process in the recording and playback device 1B according to the present embodiment is not limited to the example shown in FIG. 9. For example, the recording and playback device 1B may repeatedly perform S132 to S144 shown in FIG. 9, and may performs the estimation process in accordance with voice signal estimation filters corresponding to specific users detected sequentially in response to switching of a specific user.

The recording and playback device 1B according to the present embodiment is not limited to the IC recorder capable of recording and playing back voices. The recording and playback device 1B may be a device capable of recording and playing back both voice signals and video signals, such as a smartphone or a tablet terminal. In a case where the recording and playback device 1B is the smartphone (hereinafter, referred to as a smartphone 1B') for example, a user specifying unit (not shown) of the smartphone 1B' can specify a user as shown in FIG. 10.

Figure 10:
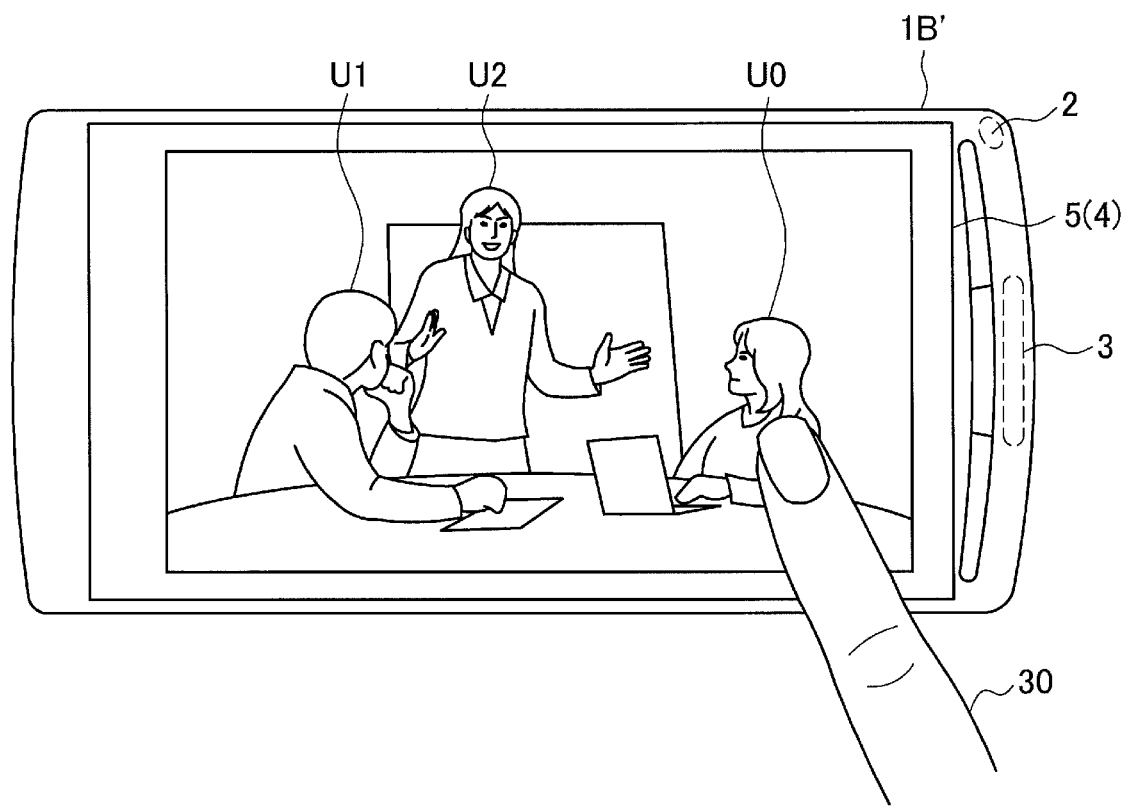
FIG. 10 is a diagram illustrating specifying a user in a smartphone according to a modification of the second embodiment.

FIG. 10 is a diagram illustrating specifying a user in the smartphone 1B' according to a modification of the second embodiment. As shown in FIG. 10, in a case in which the recording and playback device according to the second embodiment is the smartphone 1B', the display unit 5 plays back video signals of a photographed meeting for example, and the speaker unit 3 plays back sound signal of the meeting. Here, the display unit 5 is a touchscreen display having a function of the operation input unit 4.

In this case, the user specifying unit of the smartphone 1B' may set a user U0 touched with a finger 30 as a specific user from among users U0 to U2 shown in the display unit 5. Subsequently, the estimation unit 14B of the smartphone 1B' performs an estimation process on voice signals of the user U0. it may be determined (recognized) whether a voice signal is the voice signal of the user U0, by speaker recognition, or by using a voice signal played back while a mouth of the user U0 is moving in the display unit 5 as the voice signal of the user U0.

On the other hand, the user specifying unit of the smartphone 1B' may set a person whose mouth is moving (who is speaking) as a specific user from among the users U0 to U2 shown in the display unit 5. Subsequently, the estimation unit in the smartphone 1B' performs an estimation process on the basis of a voice signal estimation filter corresponding to the detected specific user.

Alternatively, the smartphone 1B' may switch a specific user every time a person whose mouth is moving changes, and subsequently the smartphone 1B' may performs the estimation process in accordance with voice signal estimation filters corresponding to specific users detected sequentially in response to the switching of the specific user <2-3. Supplement>

In the second embodiment described above, the estimation process is performed on the voice signals stored in the voice signal DB 17. However, the voice signals stored in the voice signal DB 17 is not necessarily voice signals through air conduction. Thus, it is obvious that a recording and playback device serving as the recording and playback device 1A according to the first embodiment and the recording and playback device 1B according the second embodiment is also within the scope of the present disclosure. Accordingly, it is also assumed that the voice signal stored in the voice signal DB 17 are voice signals that have already been subjected to the estimation process.

Therefore, before the estimation unit 14 performs the estimation process at a time of playback, the recording and playback device 1 according to the present embodiments may determine whether a voice signal read out from the voice signal DB 17 is a voice signal that has already been subjected to the estimation process, and then may perform the estimation process. Next, detailed explanation is provided with reference to FIGS. 11A and 11B.

Figure 11A:
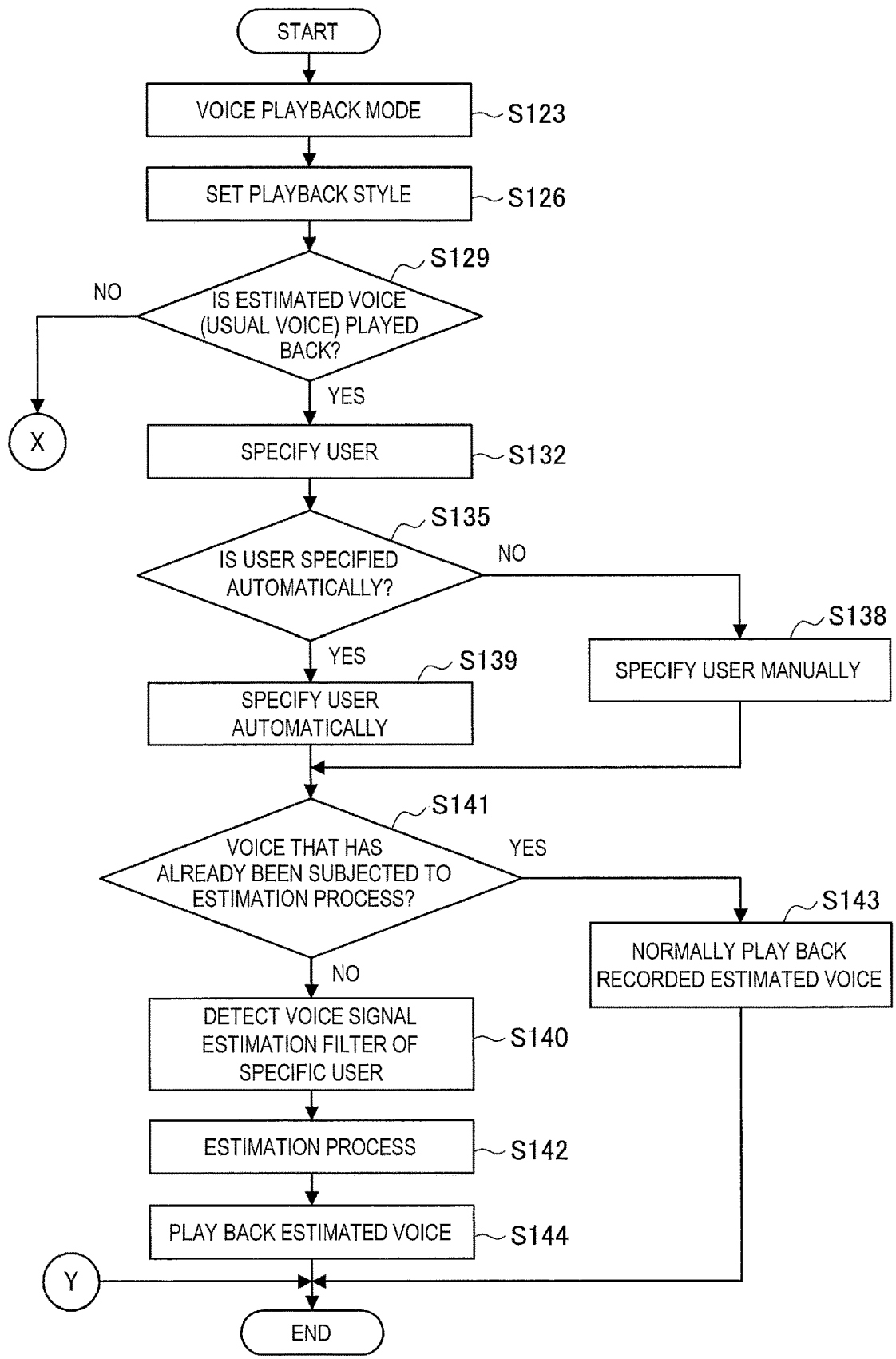
FIG. 11A is a flowchart showing an operation process for determining whether a voice signal read out from a voice signal DB is a voice signal that has already been subjected to an estimation process.
Figure 11B:
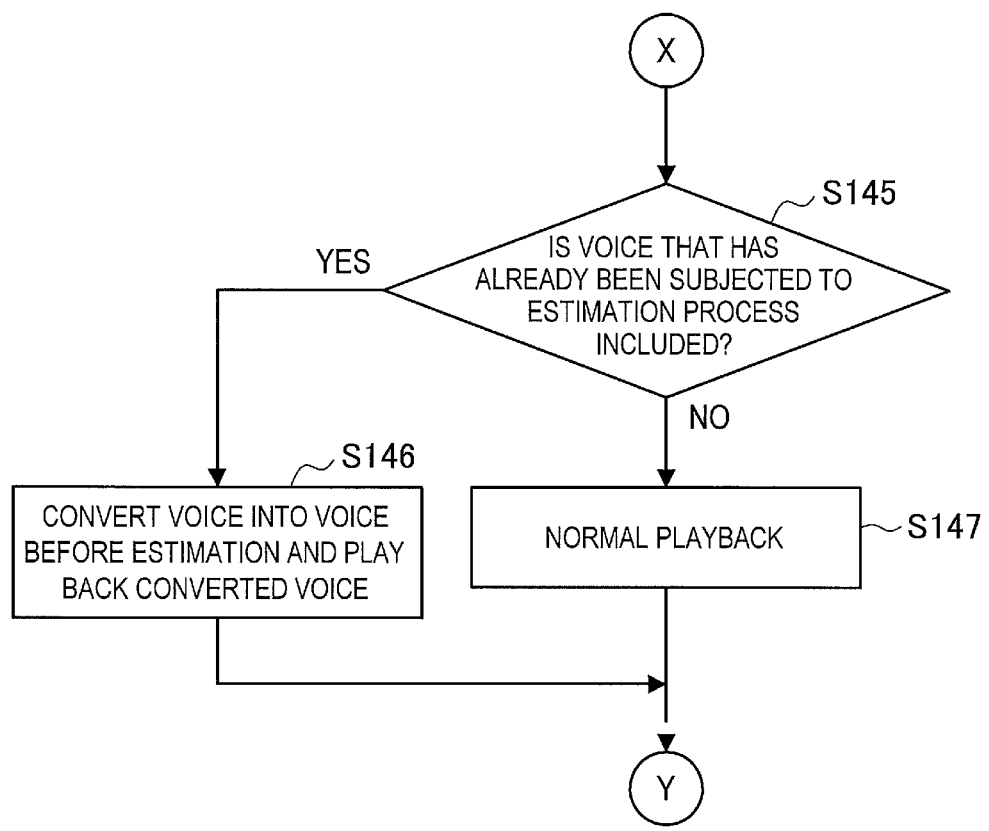
FIG. 11B is a flowchart showing an operation process for determining whether a voice signal read out from a voice signal DB is a voice signal that has already been subjected to an estimation process.

FIGS. 11A and 11B are each a flowchart showing an operation process for determining whether a voice signal read out from the voice signal DB 17 is a voice signal that has already been subjected to an estimation process.

Steps S123, S126, S129, S132, S135, S138, and S139 shown in FIG. 11A are similar to the steps explained with reference to FIG. 9. Accordingly, repeated explanation is omitted.

In Step S141 in FIG. 11A, the estimation unit 14 of the recording and playback device 1 determines whether a specific user's voice signal included in voice signals read out from the voice signal DB 17 is a voice signal that has already been subjected to an estimation process. For example, the estimation unit 14 may determine whether the voice signal has already been subjected to the estimation process, on the basis of attribute information attached to the voice signals read out from the voice signal DB 17.

Next, in a case in which it is determined that the voice signal is not the voice signal subjected to the estimation process (NO in Step S141), the recording and playback device 1 causes the speaker unit 3 to play back a voice signal (usual voice) obtained by performing the estimation process on the voice signal of the specific user in Steps S140, S142, and S144 in a way similar to the same steps in FIG. 9.

On the other hand, in a case in which it is determined that the voice signal is the voice signal subjected to the estimation process (YES in Step S141), the recording and playback device 1 does not perform the estimation process, and causes the speaker unit 3 to directly play back the voice signal read out from the voice signal DB 17, in Step S143.

On the other hand, in a case in which the normal playback is set in Step S129 in FIG. 11A, in other words, in a case of setting for playing back a raw voice signal through air conduction without the estimation process (NO in Step S109), a process shown in Step S145 in FIG. 11B is performed. In Step S145, the estimation unit 14 of the recording and playback device 1 determines whether a specific user's voice signal included in voice signals read out from the voice signal DB 17 is a voice signal that has already been subjected to an estimation process.

In a case in which it is determined that the voice signal is not the voice signal subjected to the estimation process (NO in Step S145), the recording and playback device 1 causes the speaker unit 3 to directly play back the voice signal through air conduction that has been read out from the voice signal DB 17 in Step S147 in a way similar to the same step in FIG. 9.

On the other hand, in a case in which it is determined that the voice signal is the voice signal that has already been subjected to the estimation process (YES in Step S145), the recording and playback device 1 returns the voice signal subjected to the estimation process to the voice signal before the estimation, and plays back the voice signal in Step S146. More specifically, the estimation unit 14 of the recording and playback device 1 performs a process to estimate a voice signal (recorded voice) through air conduction on the basis of a voice signal (usual voice) subjected to the estimation process.

For example, on the basis of Expression 1 and Expression 3 explained with reference to FIG. 3, a method for estimating a recorded voice (Orec0) of a specific user U0 based on a usual voice (Ousual0) of the specific user U0 can be represented by Expression 8 as follows.

[Math 8]

$$Orec0 = \{HacO/(HacO+HbcO)\} \times Ousual0 \qquad \text{Expression 8}$$

In addition, in a case of a recorded voice (Orec1, Orec2, . . . ) of another user U1, U2, . . . , the estimation unit 14A can perform the estimation process in a way similar to Expression 8 described above. A specific example is represented by Expression 9 as follows.

[Math 9]

$$Orec\_n = \{Hac\_n/(Hac\_n+Hbc\_n)\} \times Ousual\_n \qquad \text{Expression 9}$$

As explained above, the recording and playback device 1 according to the present disclosure can appropriately convert a voice signal stored in the voice signal DB 17 into a predetermined voice signal (recorded voice/usual voice) and can play back the predetermined voice signal, regardless of whether the voice signal is a voice signal (recorded voice) through air conduction or a voice signal (usual voice) that has already been subjected to an estimation process.

<<3. Conclusion>>

As described above, in the recording and playback control system according to the embodiments, a voice signal that is directly heard by a specific user usually is estimated at a time of recording/playback on the basis of a voice signal through air conduction of the specific user. Accordingly, a feeling of strangeness at a time of playing back and hearing a recorded own voice can be eliminated.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, it is also possible to create a computer program for causing hardware such as CPU, ROM, and RAM, which are embedded in the playback control device 1, to execute the above-described functions of the playback control device 1. Moreover, it may be possible to provide a computer-readable storage medium having the computer program stored therein.

Additionally, the present technology may also be configured as below.

(1)

A storage control device including:

a filter detecting unit configured to detect a voice signal estimation filter for estimating a first voice signal heard by a specific user himself/herself;

an estimation unit configured to estimate the first voice signal heard by the specific user himself/herself, on the basis of a voice signal including a second voice signal of the specific user collected by an air conduction sound collecting unit in accordance with the voice signal estimation filter detected by the filter detecting unit; and a storage control unit configured to cause a storage unit to store the first voice signal estimated by the estimation unit.

(2)

The storage control device according to (1), further including:

a user specifying unit configured to specify a user, wherein the filter detecting unit selectively detects a voice signal estimation filter corresponding to the user specified by the user specifying unit, and wherein, in accordance with the voice signal estimation filter detected by the filter detecting unit, the estimation unit estimates a first voice signal heard by the specified user himself/herself, on the basis of a second voice signal corresponding to a voice of the specified user collected by the air conduction sound collecting unit arranged around the specified user.

(3)

The storage control device according to (2), wherein, in response to switching of a user specified by the user specifying unit, the estimation unit estimates a first voice signal on the basis of a voice signal corresponding to a voice of the switched specific user in accordance with a voice signal estimation filter corresponding to the specific user that is sequentially detected by the filter detecting unit.

(4)

The storage control device according to any one of (1) to (3), wherein the first voice signal heard by the specific user himself/herself is a voice signal heard by the user through bone conduction and air conduction.

(5)

The storage control device according to any one of (1) to (4), further including:

a storage unit configured to store a voice signal estimation filter corresponding to each user.

(6)

A playback control device including:

a user specifying unit configured to specify a user;

a filter detecting unit configured to detect a voice signal estimation filter corresponding to the user specified by the user specifying unit;

an estimation unit configured to estimate a first voice signal heard by the specified user himself/herself, on the basis of a voice signal corresponding to a voice of the specified user among input voice signals in accordance with the voice signal estimation filter detected by the filter detecting unit; and a playback control unit configured to cause a playback unit to play back the first voice signal estimated by the estimation unit.

(7)

The playback control device according to (6), wherein, in response to switching of a user specified by the user specifying unit, the estimation unit estimates a first voice signal on the basis of a voice signal corresponding to a voice of the switched specific user in accordance with a voice signal estimation filter corresponding to the specific user that is sequentially detected by the filter detecting unit.

(8)

The playback control device according to (6) or (7), wherein, among the input voice signals, the estimation unit estimates a first voice signal heard by a specific user himself/herself on the basis of a second voice signal corresponding to a voice of the specific user collected by an air conduction sound collecting unit.

(9)

The playback control device according to (6) or (7), wherein the estimation unit does not perform an estimation process when it is detected that the voice signal corresponding to the voice of the specified user is the first voice signal that has already been estimated in accordance with the voice signal estimation filter.

(10)

The playback control device according to any one of (6) to (9), further including:

a storage unit configured to store a voice signal estimation filter corresponding to each user.

(11)

A recording medium having a program recorded thereon, the program causing a computer to function as:

a filter detecting unit configured to detect a voice signal estimation filter for estimating a first voice signal heard by a specific user himself/herself;

an estimation unit configured to estimate the first voice signal heard by the specific user himself/herself, on the basis of a voice signal including a second voice signal of the specific user collected by an air conduction sound collecting unit in accordance with the voice signal estimation filter detected by the filter detecting unit; and a storage control unit configured to cause a storage unit to store the first voice signal estimated by the estimation unit.

(12)

A recording medium having a program recorded thereon, the program causing a computer to function as:

a user specifying unit configured to specify a user;

a filter detecting unit configured to detect a voice signal estimation filter corresponding to the user specified by the user specifying unit;

an estimation unit configured to estimate a first voice signal heard by the specified user himself/herself, on the basis of a voice signal corresponding to a voice of the specified user among input voice signals in accordance with the voice signal estimation filter detected by the filter detecting unit; and a playback control unit configured to cause a playback unit to play back the first voice signal estimated by the estimation unit.

REFERENCE SIGNS LIST 1, 1A 1A', 1B recording and playback device
1B' smartphone (recording and playback device)

2 microphone
3 speaker unit
4 operation input unit
5 display unit
10A main control unit
10B main control unit
11 user specifying unit
12 filter detecting unit
13 voice signal estimation filter DB
14A estimation unit
14B estimation unit
141 sound source separation processor
143 voice determination processor
145 estimation processor
147 combiner
15 A/D converter
16A storage control unit
16B storage control unit
17 voice signal DB
18A playback control unit
18B playback control unit
U0 to U2 user

The invention claimed is:

1. A storage control device, comprising:
a user specifying unit configured to specify a first user of a plurality of users as a target user;
a filter detecting unit configured to detect a first transfer function of a plurality of transfer functions as a first voice signal estimation filter,
wherein the first transfer function corresponds to the first user;
an estimation unit configured to:
determine whether a first voice of the first user has been subjected to an estimation of a corresponding voice signal previously;
estimate a first voice signal based on the first voice of the first user, the detected first transfer function, a second voice of a second user of the plurality of users, and the determination that the first voice of the first user has not been subjected to the estimation of the corresponding voice signal previously; and
combine the first voice signal subjected to the estimation with a second voice signal of the second user to generate a combined voice signal, wherein the first voice signal is different from the second voice signal; and
a storage control unit configured to control a memory to store the combined voice signal as an estimated voice signal.

2. The storage control device according to claim 1, wherein
the first voice of the first user and the second voice of the second user are collected by a microphone, and
the microphone is in a threshold vicinity of the first user and the second user.

3. The storage control device according to claim 1, wherein
the filter detecting unit is further configured to detect a second transfer function of the plurality of transfer functions as a second voice signal estimation filter, and
the second voice signal estimation filter corresponds to the second voice of the second user.

4. The storage control device according to claim 1, wherein the first voice signal is heard by the first user by bone conduction and air conduction.

5. The storage control device according to claim 1, further comprising a storage unit configured to store the first voice signal estimation filter corresponding to the first user.

6. The storage control device according to claim 1, wherein the first transfer function is a combination of an air conduction signal and a bone conduction signal.

7. The storage control device according to claim 6, wherein the filter detecting unit is further configured to detect the first transfer function based on a facial shape of the first user.

8. The storage control device according to claim 1, wherein the first transfer function is previously associated with the first user.

9. A playback control device, comprising:
a user specifying unit configured to specify a first user of a plurality of users as a target user;
a filter detecting unit configured to detect a first transfer function of a plurality of transfer functions as a first voice signal estimation filter,
wherein the first transfer function corresponds to the first user;
an estimation unit configured to:
determine whether a first voice of the first user has been subjected to an estimation of a corresponding voice signal previously;
estimate a first voice signal based on the first voice of the first user, the detected first transfer function, a second voice of a second user of the plurality of users, and the determination that the first voice of the first user has not been subjected to the estimation of the corresponding voice signal previously; and
combine the first voice signal subjected to the estimation with a second voice signal of the second user to generate a combined voice signal, wherein the first voice signal is different from the second voice signal; and
a playback control unit configured to control a playback unit to play back the combined voice signal as an estimated voice signal.

10. The playback control device according to claim 9, wherein
the filter detecting unit is further configured to detect a second transfer function of the plurality of transfer functions as a second voice signal estimation filter, and
the second voice signal estimation filter corresponds to the second voice of the second user.

11. The playback control device according to claim 9, wherein
the first voice of the first user and the second voice of the second user are collected by a microphone, and
the microphone is in a threshold vicinity of the first user and the second user.

12. The playback control device according to claim 9, further comprising a storage unit configured to store the first voice signal estimation filter corresponding to the first user.

13. A non-transitory computer-readable medium having stored thereon computer-executable instructions, which when executed by a computer, cause the computer to execute operations, the operations comprising:
specifying a first user of a plurality of users as a target user;
detecting a transfer function of a plurality of transfer functions as a first voice signal estimation filter,
wherein the transfer function corresponds to the first user;

determining whether a first voice of the first user has been subjected to an estimation of a corresponding voice signal previously;

estimating a first voice signal based on the first voice of the first user, the detected transfer function, a second voice of a second user of the plurality of users, and the determination that the first voice of the first user has not been subjected to the estimation of the corresponding voice signal previously;

combining the first voice signal subjected to the estimation with a second voice signal of the second user to generate a combined voice signal, wherein the first voice signal is different from the second voice signal; and controlling a memory to store the combined voice signal as an estimated voice signal.

14. A non-transitory computer-readable medium having stored thereon computer-executable instructions, which when executed by a computer, cause the computer to execute operations, the operations comprising:

specifying a first user of a plurality of users as a target user;

detecting a transfer function of a plurality of transfer functions,
wherein the transfer function corresponds to the first user;

determining whether a first voice of the first user has been subjected to an estimation of a corresponding voice signal previously;

estimating a first voice signal based on the first voice of the first user, the detected transfer function, a second voice of a second user of the plurality of users, and the determination that the first voice of the first user has not been subjected to the estimation of the corresponding voice signal previously;

combining the first voice signal subjected to the estimation with a second voice signal of the second user to generate a combined voice signal, wherein the first voice signal is different from the second voice signal; and controlling a playback unit to play back the combined voice signal as an estimated voice signal.

* * * * *